United States Patent

[11] 3,592,178

| [72] | Inventor | Peter Schiff |
| | | R.D. #2, Lambertville, N.J. 08530 |
| [21] | Appl. No. | 866,670 |
| [22] | Filed | Oct. 15, 1969 |
| [45] | Patented | July 13, 1971 |

[54] ELECTRONIC IGNITION TIMING CIRCUIT
11 Claims, 5 Drawing Figs.

[52] U.S. Cl. ............................................. 123/148, 123/117
[51] Int. Cl. ............................................. F02p 1/00, F02p 5/04
[50] Field of Search ............................................. 123/148 E

[56] References Cited
UNITED STATES PATENTS

| 3,202,146 | 8/1965 | Short et al. | 123/178 |
| 3,314,407 | 4/1967 | Schneider | 123/178 |
| 3,521,611 | 7/1970 | Finch | 123/178 |

*Primary Examiner*—Mark M. Newman
*Assistant Examiner*—Ronald B. Cox
*Attorney*—Ostrolenk, Faber, Gerb & Soffen ABSTRACT: A solid-state electronic timing circuit for adjusting the initial idling timing, the rate of advance of timing with increasing engine r.p.m. and the maximum advance by means of readily accessible manual adjusting means to obtain peak engine performance, which system is used in place of conventional timing means such as ignition points. The system is controlled by position markers and cylinder reference markers generated by the rotation of the distributor shaft. These signals are electronically manipulated to produce accurate ignition timing pulses. Electronically, the initial timing, rate of advance with increasing r.p.m., and maximum advance is accurately controlled by simple dashboard adjustment. The output pulse is applied to a control circuit for delivering the spark to the distributor, which spark will be of sufficient energy to provide good ignition.

PETER SCHIFF
INVENTOR.

BY
Ostrolenk, Faber, Gerb & Soffen
ATTORNEYS

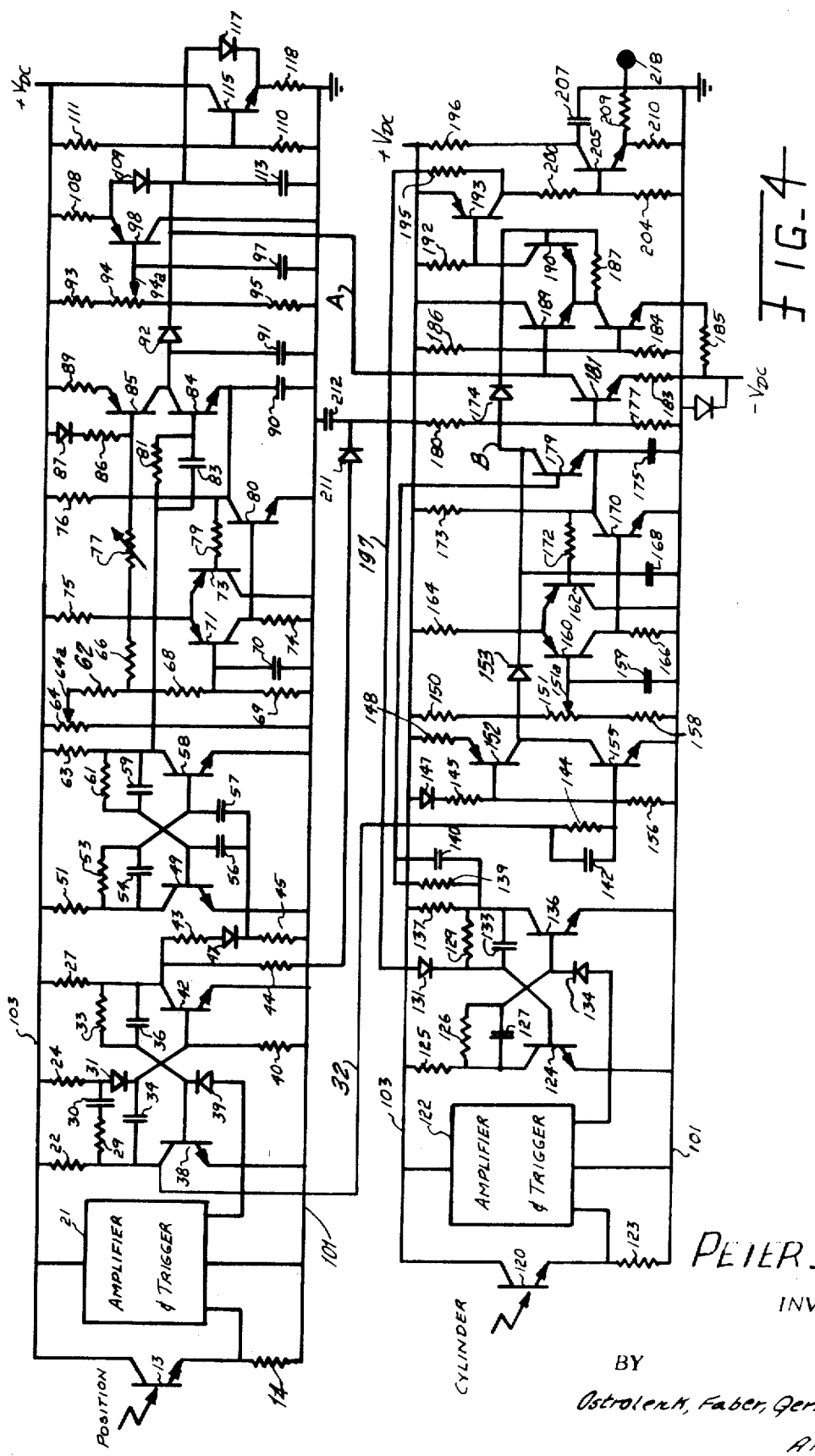

ELECTRONIC IGNITION TIMING CIRCUIT

The present invention relates to ignition timing means and more particularly to a novel solid-state electronic ignition timing means for use in controlling the ignition of internal combustion engines to achieve maximum engine efficiency while at the same time eliminating the disadvantages of the mechanical inertia present in conventional ignition timing advance devices.

BACKGROUND OF INVENTION

In order to obtain the proper performance and tuning of ignition type internal combustion engines it is vital to provide for accurate timing of the ignition spark since this timing affects the performance, efficiency and exhaust emission of the engine. Ignition timing must be adjusted over about a 30° angle of crankshaft rotation as engine speed is altered, in order to compensate for the relatively slow flame propagation and ignition delay time which occurs in the combustion chamber. In conventional systems, ignition timing and advance is accomplished by an initial idling setting and a mechanical advance which is employed to duplicate conditions which are determined through complex testing and performance evaluation. The present invention is characterized by providing a solid-state electronic device that permits the adjustment of initial idle timing, rate of advance with increasing engine r.p.m., and maximum advance by means of simple manual adjustments which may be provided upon or near the vehicle dashboard so as to readily obtain peak engine performance. Aside from the simplicity of adjustment and insured peak engine performance, the device offers advantages over the performance characteristics of conventional timing means.

Conventional techniques for providing for accurate timing of ignition sparks are typically comprised of either a vacuum or centrifugal advance technique. The timing affected by such an arrangement is previously determined through extensive performance testing. Such techniques do not compensate for the variations of fuel, altitude and temperature typically experienced during engine operation. In one-of-a-kind engines such as are employed in racing vehicles, the adjustment and timing range of such mechanical devices for controlling ignition timing and the effort and expense put forth in the tuning process typically represents a very significant portion of the overall effort and expenses in developing such an engine. Despite the time consuming and laborious testing of conventional devices, the ignition timing of such conventional techniques is never perfect and is further significantly affected by mechanical wear.

The present invention is comprised of means for generating pulses at a rate controlled by the distributor shaft of the engine wherein a first-generated pulse train represents the position of the distributor shaft at any given instant and wherein a second train of pulses represents the initiation of the timing cycle for each cylinder of the engine. These pulses are applied to first and second circuits respectively. The first circuit generates a train of pulses of predetermined constant slope for charging a first storage means which, in turn, subsequently charges a second storage means. The rate at which the distributor shaft rotates (i.e., distributor shaft r.p.m.) controls the elapsed time during which the constant slope pulses are applied to the first storage means. The second storage means develops a voltage level representative of the peak voltage of the charging rate. The second circuit generates a staircase voltage level initiated upon the generation of a pulse representative of the initiation of the ignition timing for each cylinder. The staircase voltage level, which is of substantially constant waveshapes regardless of engine speed, is compared against the peak voltage level developed by the second storage means to generate a trigger pulse representative of the desired or required spark timing.

This trigger pulse is applied through a distributor control circuit comprised of an inverter circuit operating at a frequency much greater than the ignition frequency, which circuit applies pulses to a half-wave doubler for charging a storage means to provide sufficient energy for generating a spark whose energy, in turn, assures good ignition. The use of inductive components between the half-wave doubler and the storage means sufficiently isolates the inverter circuit from the load when the load is in the discharge condition so as to prohibit malfunctioning of the converter circuit, so as to provide rapid resetting of the SCR in the load circuit controlled by the trigger pulses developed by the comparison means and further so as to enable the use of components of significantly reduced value and size while assuring successful operation.

The minimum and maximum advance and the rate of change of advance with change in r.p.m. is made adjustable so as to obtain the particular performance characteristics desired by the user, which adjustments may be made, for example, directly from the dashboard of the vehicle.

It is, therefore, one object of the present invention to provide an all-electronic solid-state circuit for controlling ignition timing of a vehicle wherein engine r.p.m. and rate of change of engine r.p.m. are converted into a representative voltage level which is compared with a staircase voltage level generated once for each cylinder of the engine for triggering spark advance when these voltage levels reach a predetermined relationship.

Another object of the present invention is to provide a novel ignition spark generating circuit comprised of an inverter circuit operating at a frequency many times greater than maximum ignition frequency and isolated from the load by means of inductive elements which provides excellent isolation between the inverter circuit and the load to assure successful performance of all components due to this isolation and in which the component values and overall physical size is significantly reduced as compared with conventional devices.

Still another object of the present invention is to provide an all-electronic solid-state circuit for controlling ignition timing of a vehicle wherein engine r.p.m. and rate of change of engine r.p.m. are converted into a representative voltage level which is compared with a staircase voltage level generated once for each cylinder of the engine for triggering spark advance when these voltage levels reach a predetermined relationship and wherein the spark generating circuit is comprised of an inverter circuit operating at a frequency many times greater than maximum ignition frequency and isolated from the load by means of inductive elements which provides excellent isolation between the inverter circuit and the load to assure successful performance of all components due to this isolation and in which the component values and overall physical size is significantly reduced as compared with conventional devices.

These as well as other objects of the present invention will become apparent when reading the accompanying description and drawings in which:

FIG. 4 is a circuit diagram showing the ignition timing circuit of FIG. 1 in greater detail.

Figures 2A, 2B:
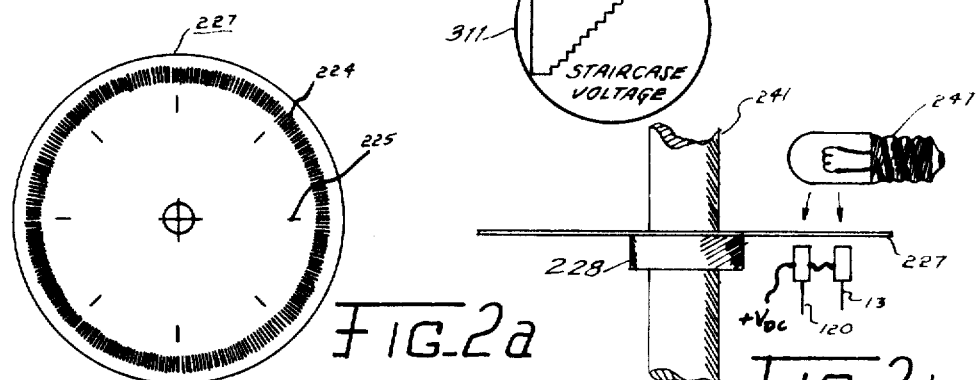
FIG. 2b shows an elevational view of the means employed for developing the pulses applied to the electronic ignition timing circuit of FIG. 1.
FIG. 2a shows a top plan view of the disc member of FIG. 2b.

FIGS. 2a and 2b show a disc member 227 coupled by suitable means such as, for example, a collar 228 to the distributor shaft 241 of an engine. If desired, disc 227 may be mounted directly to the engine crankshaft. The disc 227 may, for example, be formed of a transparent material and provided with a plurality of radially aligned markers or indicia spaced at 2° intervals near the outer periphery of the disc and designated by the numeral 224. The markers are preferably opaque on the transparent surface. Alternatively, the disc may be coated with an opaque material and the markers may be in the form of transparent radially aligned indicia.

As can best be seen from FIG. 2a, the timing markers 224 are arranged within a circular band or track. In addition thereto, eight equally spaced markers 225 are arranged within a second band or track spaced inwardly from the first band or track. The equally spaced markers 225 are arranged at 45° intervals around the disc there being one per cylinder for an eight cylinder engine, for example. Obviously, engines employing greater or lesser numbers of cylinders would utilize a disc having a greater or lesser number of markers 225.

When the disc is mounted on the distributor shaft 241 2° of disc rotation corresponds to 4° of crankshaft rotation. A suitable light source 247 is positioned to one side of disc 227 and is adapted to provide light sufficient for illuminating both of the tracks containing markers 224 and 225, respectively. Photosensitive transistors 13 and 120 are positioned beneath each associated track for generating pulses indicative of the passage of a marker. The preferred operation is such that each leading edge of position markers 224 causes a first pulse to be generated and the trailing edge of the markers 224 causes a second pulse to be generated. Only a single pulse is generated for each cylinder marker of track 225. Although the preferred embodiment for generating pulses at a rate controlled by the distributor shaft r.p.m. has been described as light sensitive means utilized in conjunction with a slotted or otherwise marked disc, it should be understood that the disc may be comprised of tracks similar to those shown in FIG. 2a having ferromagnetic markers which may be detected by magnetic read heads. Obviously, any other form of pulse generating means may be employed for generating pulses at a rate representative of the distributor shaft r.p.m.

The operation of the system is based upon the utilization of the pulses developed by the photosensitive transistors 13 and 120. These phototransistors are shown in schematic fashion in FIG. 1 and have their emitter-electrodes coupled to input terminals of amplifier trigger circuits 21 and 122, respectively, which circuits act to amplify and shape the pulses to produce sharp trigger pulses. The pulses derived from markers 224, which will hereinafter be referred to as position pulses, are amplified and shaped by circuit 21 and applied to a monostable multivibrator 163. The application of each position pulse for both the leading and trailing edges of the position markers causes the monostable multivibrator to unclamp a constant current source for a finite time, which constant current source is provided in the staircase generator 310. Another constant current source (which will be more fully described) in the tachometer circuit generates a linear voltage pulse between alternate monostable multivibrator pulses. The length and peak amplitude of each linear voltage pulse is determined by the occurrence of monostable multivibrator pulses, the greater the amplitude of the constant slope pulses generated in the tachometer circuit 306, and vice versa. The peak amplitude of the linear voltage pulses is filtered by suitable storage means and appears at output terminal A of tachometer circuit 306. This signal has a low amplitude representative of high speeds (i.e., distributor shaft rotating at a high r.p.m.) and has a high amplitude for low speeds corresponding to a slower rate of position pulse (i.e., distributor shaft rotating at a lower r.p.m.). Further circuitry is provided in tachometer circuit 306 for limiting the maximum and minimum voltage appearing at output terminal A corresponding to minimum and maximum advance, respectively. Manually adjustable means (to be more fully described) governs the output of the constant current source to control the rate of advance with increasing engine r.p.m.

The monostable multivibrator circuit 163 also drives a staircase generator circuit 310 which is comprised of a constant current source. This constant current source is unclamped upon the occurrence of each monostable output pulse. The current of this constant current source charges a capacitor to develop a voltage staircase waveform (see inset 311) which waveform appears at the output terminal B.

The pulses developed by the markers 225 provided in the inner track of disc 227 (hereinafter referred to as cylinder pulses) undergo amplifying and shaping in circuit 122 and are applied to the input terminal of a bistable multivibrator circuit 304. This circuit is set by the output of trigger circuit 308, causing the staircase generator to be clamped. The next pulse (i.e., the pulse developed by the cylinder marker) resets bistable circuit 304, again allowing the staircase generator to develop another staircase waveform indicative of the crankshaft position between successive cylinders.

The output B of staircase generator circuit 310 is applied to a trigger circuit 308 which generates a trigger pulse whenever the staircase voltage appearing in line B exceeds the tachometer voltage appearing at input line A. The staircase voltage is constant for a particular position of crankshaft rotation and is recycled for every cylinder. However, the tachometer voltage decreases with increasing engine r.p.m. and therefore causes the trigger module 308 to fire sooner for higher r.p.m.'s giving an advance in timing, or later for lower r.p.m.'s giving a delay in timing. Initial timing is determined by the maximum tachometer output voltage and the maximum advance is determined by the minimum tachometer voltage. Both of these parameters and the advance rate are adjustable through the manual adjustable means (to be more fully described) provided in tachometer module 306. An adjustable offset voltage in staircase generator 310 adjusts the initial timing.

Figure 1:
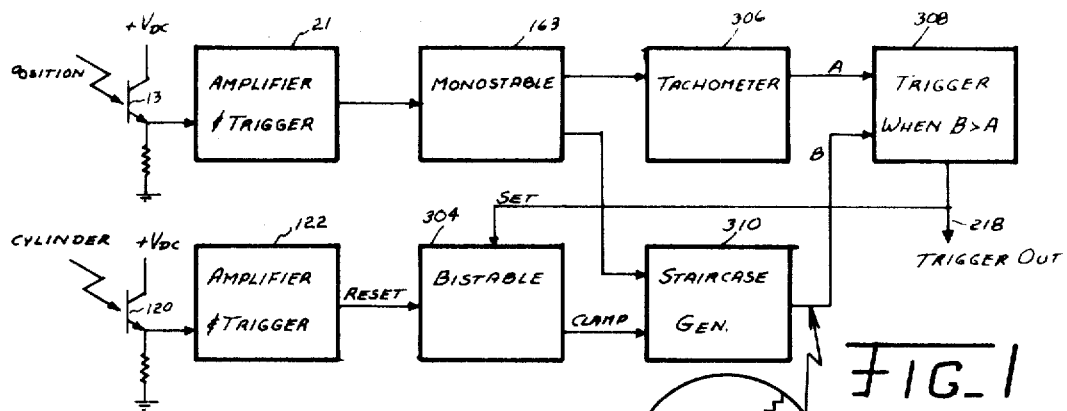
FIG. 1 is a block diagram showing the ignition timing circuit of the present invention.

FIG. 4 shows a detailed schematic diagram of the block diagram shown in FIG. 1. The position phototransistor 13 has its emitter-electrode connected to ground through a resistor 14. The emitter-electrode is coupled to the input terminal of amplifier and trigger circuit 21. Since amplification and trigger circuits are well known in the art, no detailed circuitry has been shown, it being understood that any circuit suitable for amplification and pulse shaping may be employed herein so as to provide a sharp trigger pulse for both the leading and trailing edge of position markers, for successful operation of the circuit. The output of circuit 21 is coupled to the input of the monostable multivibrator circuit 163 through diode 39, which is coupled to the base electrode of transistor 38. Transistor 38, together with transistor 42 forms the monostable multivibrator circuit 163.

The monostable multivibrator circuit is adapted to generate a trigger pulse having a pulse duration generally in the range from 20—40 microseconds. Capacitors 34 and 36, which are coupled respectively between the collector and base electrodes and base and collector electrodes of transistors 38 and 42, respectively, are employed as the "speed-up" capacitors, while capacitor 30, coupled between the collector of transistor 38 and the base of transistor 42 (through series connected resistor 29 and diode 31) is employed as the timing capacitor. Diode 31 protects the base emitter junction of transistor 42. Resistor 29 permits the collector-emitter voltage of transistor 38 to go positive before capacitor 34 is charged so as to significantly reduce the rise time of the pulse developed by the monostable multivibrator. In operation, transistor 42 is normally turned ON. The application of an output pulse from circuit 21 briefly turns ON transistor 38 and turns OFF transistor 42 causing the application of a positive going pulse appearing at its collector terminal to be applied to the input terminal of a bistable flip-flop circuit comprised of transistors 49 and 58. The output level appearing at the collector of transistor 42 develops an IR drop across resistor 43, diode 47 and resistor 45. The voltage developed across resistor 45 applies a positive going pulse to the bistable flip-flop circuit comprised of transistors 49 and 58 (which form part of the tachometer circuit 306) causing a reversal in state of the bistable circuit for each monostable multivibrator pulse.

Tachometer circuit 306 is comprised of transistors 49, 58, 71, 73, 80, 84, 85, 98 and 115. The bistable circuit, already described hereinabove, develops an output level appearing at the collector of transistor 58 which is coupled through the parallel connected resistor 81 and capacitor 83 to the base electrode of transistor 84. The pulse developed by the leading edge of a position marker triggers the operation of monostable multivibrator circuit 163 (comprised of transistors 38 and 42) causing the application of a pulse to the bistable circuit comprised of transistors 49 and 58. The pulse developed by the trailing edge of each position marker similarly causes the monostable multivibrator circuit 163 to generate a trigger pulse which again causes the bistable circuit comprised of transistors 49 and 58 to change its state. Thus, the bistable circuit comprises a divide-by-two circuit. During the time between the trailing edge of each marker pulse and the leading edge of the next marker pulse or vice versa transistor 58 conducts, causing transistor 84 (coupled to the collector of transistor 58 through the parallel connected resistor and capacitor 81 and 83, respectively) to be in cutoff state enabling capacitor 91 to be charged in a linear fashion by a constant current source comprised of transistor 85 and resistor 89 which causes capacitor 91 to charge in a linear fashion. Upon the occurrence of the next position marker leading edge, transistor 58 is cutoff causing transistor 84 to be turned on and thereby discharging capacitor 91 through transistor 84 and transistor 80 to ground potential bus 101. Capacitor 91 is prevented from discharging fully by the state of transistor 80 whose base electrode is connected to and controlled by the potential level appearing at the collector of transistor 71 which, together with transistor 73 forms a control circuit for controlling the level of conduction of transistor 80. The emitters of transistors 71 and 73 are connected in common through resistor 75 to positive DC bus 103. The base of transistor 73 is coupled through resistor 79 to the common terminal between resistor 76 and the collector of transistor 80. Resistor 76 is connected to the positive DC bus 103. The collector of transistor 71 is connected through resistor 74 to ground potential bus 101. The base electrode of transistor 71 is connected to the common terminal between resistors 68 and 69. Resistor 69 is connected to ground bus 101, while resistor 68 is connected to the common terminal between resistors 62 and 66. The opposite end of resistor 62 is connected through the adjustable arm 64a of voltage divider resistor 64 which is coupled between positive DC bus 103 and ground potential bus 101. Resistor 66 is connected through adjustable resistor 77 to the base electrode of transistor 85. By appropriate adjustment of potential divider resistor 64, the conduction of transistor 71 is controlled. The voltage drop developed across resistor 74 controls the conduction of transistor 80 which is connected to ground potential bus 101 through its emitter terminal and to positive DC bus 103 through its collector terminal and resistor 76. Any changes in the magnitude of current flowing through transistor 80 appear at the base electrode of transistor 73. This increases the voltage drop across common emitter resistor 75 reflecting a corresponding change in the voltage drop across resistor 74 and thereby regulating the current flow through transistor 80 and the voltage appearing at the collector of transistor 80.

In the above manner capacitor 91 is alternately charged and discharged whereby the time duration of the linear ramp signal is controlled by distributor shaft r.p.m. Capacitor 91 is coupled through diode 92 to capacitor 113 which is adapted to be charged to the peak voltage level to which capacitor 91 is charged by each linear ramp signal and thereby filters the pulses applied to capacitor 92 to develop a voltage across capacitor 113, the magnitude of which is inversely proportional to distributor shaft r.p.m. (i.e., the higher the distributor shaft r.p.m. the lower the magnitude of the voltage developed across capacitor 113).

The current magnitude of the constant current generator comprised of transistor 85 may be manually adjusted through adjustable resistor 77 and/or potentiometer resistor 64 to regulate the slope of the ramp (linear) pulses applied to capacitor 91.

Potentiometer 64 is the dashboard adjustment determining the rate of advance with increasing r.p.m. The trimming resistor 77 determines the engine speed where various rate of advance vectors intersect. In this manner, the advance does not alter the timing at this one (generally idling) r.p.m. with the adjustment of potentiometer 64.

The capacitor 113 is directly coupled to ground potential bus 101 and is coupled through series connected resistor 108 and diode 109 to the positive DC bus 103. The voltage level appearing at the common terminal between capacitor 113 and diode 109 is coupled through output lead A to trigger circuit 308 in a manner to be more fully described.

Transistor 181 serves as a variable constant current source in conjunction with the voltage appearing at its base and the corresponding voltage across resistor 183 in its emitter. Thereby, increasing r.p.m.'s cause transistor 42 of monostable multivibrator 163 to be off a greater percentage of the time, allowing capacitor 212 to charge to higher positive potentials through resistor 44 and diode 211. The potential across capacitor 212 is divided by resistors 180 and 177 and in turn turns on transistor 181. In this manner, the current through the collector of transistor 181 serves to discharge capacitor 113 more quickly as the engine r.p.m. and the voltage across capacitor 212 increase. Thereby the ignition advance occurs instantaneously for increasing engine r.p.m.'s.

The minimum and maximum voltage level which may appear at the upper terminal of capacitor 113 is controlled by transistors 98 and 115, respectively. Transistor 98 has its collector connected to the ground potential bus 101 and its emitter electrode connected to positive DC bus 103 through resistor 108. The base electrode of transistor 98 is coupled to the adjustable arm 94a of adjustable resistor 94 which is connected at one end thereof to ground reference bus 103 through resistor 95 and at the opposite end thereof through resistor 93 to positive DC bus 103. The emitter electrode of transistor 98 is coupled in common to resistor 108 and diode 109 whose opposite terminals are connected to positive DC bus 103 and one terminal of capacitor 113, respectively. The amount of conduction of transistor 98 is controlled by the position of adjustable arm 94a causing a voltage drop of a predetermined value to be developed across resistor 108. The level appearing at the emitter electrode of transistor 98 clamps capacitor 113 to this minimum voltage value.

Transistor 115 has its emitter electrode coupled through resistor 118 to ground reference bus 101 and has its collector electrode directly connected to positive DC bus 103. The base electrode of transistor 115 is coupled to the common terminal between series connected resistors 111 and 110 which, in turn, are coupled to buses 103 and 101, respectively. The emitter electrode of transistor 115 is further coupled to one terminal of capacitor 113 through diode 117. The amount of conduction of transistor 115 is determined by the voltage level at its base electrode which, in turn, develops a predetermined voltage drop across resistor 118. This level is coupled to one terminal of capacitor 113 through diode 117 to clamp the maximum voltage level which may be achieved by capacitor 113 to the level appearing at the emitter electrode of transistor 115.

The cylinder marker pulses which are developed by phototransistor 120 are coupled through its emitter electrode to the input terminal of the amplifying and pulse-shaping circuit 122 wherein the input of circuit 122 and the emitter-electrode of phototransistor 120 are connected in common through resistor 123 to ground reference bus 101. The output of the amplifying and pulse-shaping circuit 122 is coupled to the input terminal of the bistable circuit 304 comprised of transistors 124 and 136 by means of diode 134. Transistor 136 of bistable circuit 304 is normally turned OFF so that its collector electrode, which is coupled to the base electrode of transistor 179 through parallel connected resistor and capacitor elements 139 and 140, respectively, is maintained in the ON condition to discharge capacitor 168. Upon the occurrence of the next cylinder marker pulse, the state of the bistable circuit 304 is reversed, causing transistor 179 to be turned OFF and thereby enabling the charging of capacitor 168.

The staircase generator circuit 310 is comprised of transistors 152, 155, 160, 162, 170 and 179. Transistor 152 operates as a constant current source and has its emitter electrode coupled through resistor 148 to the positive DC bus 103, while its collector electrode is coupled through diode 153 to capacitor 168 and through transistor 155 to the ground potential bus 101. Transistor 155 operates as a clamp to divert the output of constant current source transistor 152. The base electrode of transistor 155 is coupled through the parallel connected resistor 144 and capacitor 142 to lead 32 which, in turn, is connected to the collector electrode of transistor 38 which forms part of the monostable circuit 163. Capacitor 168 is caused to charge through the constant current source transistor 152 which is coupled to capacitor 168 through diode 153. The development of each position marker pulse causes transistor 155 to be turned ON for a brief interval to thereby divert the current otherwise applied to capacitor 168 to ground through transistor 155. This causes the development of a staircase waveform as shown by the inset 311 of FIG. 1.

The staircase waveform is recycled each time a cylinder marker passes by its associated photosensitive transistor 120 causing discharge of capacitor 168 through transistor 179. The maximum permissible discharge is controlled by a circuit comprised of transistors 160, 162, and 170 which is substantially similar in design and operation to the control circuit comprised of transistors 71, 73 and 80 described hereinabove with respect to tachometer circuit 306. The emitters of transistors 160 and 162 are connected in common through resistor 164 to the positive DC bus 103. The collector of transistor 160 is coupled through resistor 166 to the ground potential bus 101 and is further coupled to the base electrode of transistor 170 whose collector is connected to positive DC bus 103 through resistor 173. A potential divider circuit comprised of resistor 150, adjustable resistor 151 and resistor 158 is connected between positive and ground potential buses 103 and 101. The adjustable arm 151a of adjustable resistor 151 is coupled to the base electrode of transistor 160. The voltage level at the emitter electrode of transistor 179 is coupled to and controlled by the voltage level at the collector electrode of transistor 170. Any changes in this voltage level are applied to the base electrode of transistor 162 causing the common emitter voltage to either increase or decrease in accordance with the change, causing a commensurate decrease or increase respectively, in the voltage drop developed across resistor 166 so as to highly regulate the collector voltage of transistor 170 and thereby highly regulate the emitter voltage of transistor 179.

The staircase waveform developed across capacitor 168 appears at the output terminal B which is coupled through diode 174 to one input of the trigger circuit 308 comprised of transistors 184, 189, 190, 193 and 205. Transistors 189 and 190 have their emitter electrodes connected in common to the collector of transistor 184 whose emitter electrode is coupled through resistor 185 to a negative DC potential. The common emitter electrode of transistors 189 and 190 is further coupled through resistor 187 to the base electrode of transistor 190. The base electrode of transistor 189 is coupled in common to output terminal A and to the collector of transistor 181 whose emitter electrode is coupled to the negative DC potential through resistor 183.

When the instantaneous voltage of the staircase waveform developed across capacitor 168 exceeds the average filtered voltage developed across capacitor 113, transistor 190, which is normally turned OFF, is turned ON causing a voltage drop to be developed across resistor 192 connected between positive DC bus 103 and the collector electrode of transistor 190. This voltage drop causes the base electrode of transistor 193 to go more negative and thereby turn ON transistor 193. Transistor 193 thereby develops a voltage drop across series connected resistors 200 and 204 to turn ON transistor 205 and thereby develop a trigger pulse at its emitter electrode which is coupled to output terminal 218 through resistor 209. The conduction of transistor 193 develops a pulse at its collector electrode which is coupled through resistor 195, lead 197 and diode 131 to the base electrode of transistor 124 which forms part of the bistable circuit 304 to reverse the state of the bistable circuit and thereby develop a trigger pulse at its emitter electrode which is coupled to output terminal 218 through resistor 209. The conduction of transistor 193 develops a pulse at its collector electrode which is coupled through resistor 195, lead 197 and diode 131 to the base electrode of transistor 124 which forms part of the bistable circuit 304 to reverse the state of the bistable circuit and thereby turn ON transistor 179 and clamp the staircase waveform until the occurrence of the next cylinder marker pulse, at which time the staircase waveform is again recycled.

The control of the discharge voltage of capacitor 168 by transistor 179 may be regulated through the adjustable resistor 151 by manipulating its adjustable arm 151a.

Summarizing the operation of the ignition timing circuit:

The position pulses developed by phototransistor 13 undergo amplification and wave shaping to develop sharp trigger pulses at the output of circuit 21.

Each position pulse triggers the monostable multivibrator which generates a pulse to charge capacitor 91 in a linear or ramp fashion for a time period which is greater in length for low distributor shaft r.p.m. and shorter in length for high distribution shaft r.p.m. The diode 92 isolates the filtering capacitor 113 from capacitor 91 and further causes capacitor 113 to charge to the maximum voltage developed across capacitor 91 during the occurrence of each linear charging pulse. The slope of each charging pulse may be controlled through the adjustment of adjustable resistors 64 and/or 77. The rate of charging which is related to the distributor shaft r.p.m. may be adjusted through the adjustment of resistor 64.

The voltage level developed across capacitor 113 is high for low r.p.m. and conversely, is low for high r.p.m. of the distributor shaft 241. This voltage level is coupled through output terminal A to the base electrode of transistor 189 which forms part of trigger circuit 308.

The cylinder marking pulses developed by phototransistor 120 undergo amplification and wave-shaping by circuit 122 to develop sharp trigger pulses which are applied to bistable circuit 304. The state of bistable circuit 304 is reversed to recycle the staircase waveform by turning transistor 179 OFF. With transistor 179 in the OFF state, capacitor 168 is charged in steplike fashion under control of the monostable multivibrator circuit 163 which alternately turns transistor 155 ON and OFF to alternately cause the current developed by this constant current source to be fed through transistor 155 and capacitor 168. Diode 153 isolates capacitor 168 from transistor 155 preventing discharge of capacitor 168 through transistor 155 when transistor 155 is turned ON. The instantaneous voltage level developed across capacitor 168 appears at output terminal B and is applied to the second input terminal (i.e., the base electrode of transistor 190) to turn transistor 190 ON as soon as the voltage level at output terminal B exceeds the voltage level at output terminal A. When this occurs, the trigger pulse is developed at output terminal 218 which controls the ignition of the spark associated with the cylinder marker pulse last sensed by photosensitive transistor 120. Simultaneously therewith, a pulse is applied to bistable circuit 304 to turn transistor 179 ON and prevent capacitor 168 from recycling the staircase waveform until the next cylinder marker pulse activates phototransistor 120. The timing of the ignition trigger pulse may further by adjusted through adjustment of arm 151a of adjustable resistor 151 to control the amount of discharge of capacitor 168 by controlling the voltage level at the emitter electrode of transistor 179. This adjustment determines the idle timing.

Figure 3:
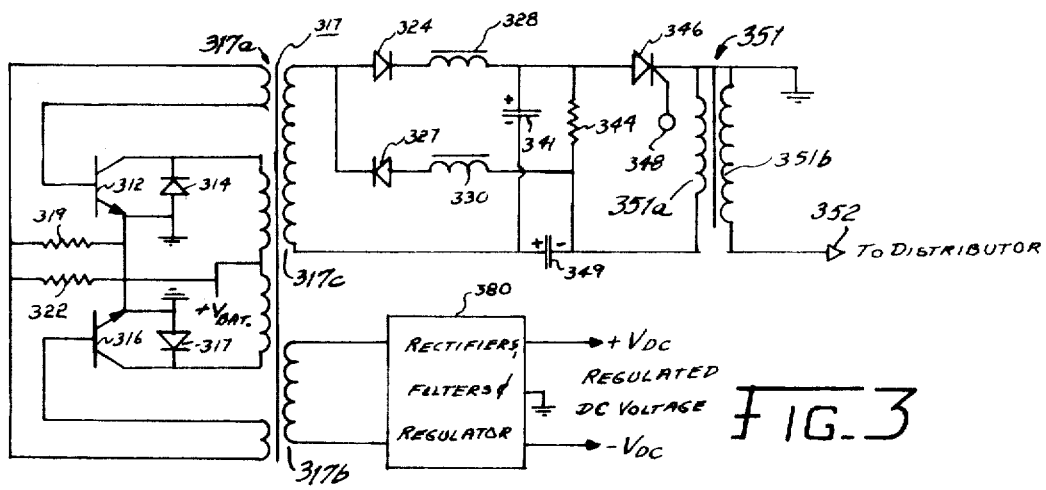
FIG. 3 is a circuit diagram showing the spark generating circuit employed for providing the requisite energy for spark ignition.

The pulse developed at output terminal 218 which is utilized to ignite the proper spark plug may be supplied to the distributor of the engine through the ignition circuit shown in FIG. 3.

The ignition circuit of FIG. 3 is comprised of an inverter circuit, including transistors 312 and 316 connected in push-pull fashion through the appropriate sections of the primary winding 317a of transformer 317. Basically, the inverter circuit operates to convert DC voltage (i.e., battery voltage) into AC at a frequency preferably in the range from 4,000—20,000 cycles per second, which is significantly higher than the frequency of ignition pulses which at maximum r.p.m. is of the order of 400 pulses per second. One secondary winding 317b of transformer 317 inductively couples the output of the inverter circuit to a circuit 380 which rectifies, filters and regulates the AC waveform to produce a regulated DC voltage for providing suitable bias levels for the circuit shown in FIG. 4.

A secondary winding 317c of transformer 317 has a first terminal thereof connected to the anode and cathode electrodes of diodes 324 and 327 which form a half-wave doubler circuit. The remaining terminal of winding 317c is coupled to the common terminal between capacitors 341 and 349. Resistor 344 is connected in parallel across the series connected capacitors 341 and 349. The cathode of diode 324 is connected to one terminal of capacitor 341 through an RF choke 328 while the anode of diode 327 is coupled to one terminal of capacitor 349 through choke 330. The anode of an SCR 346 is coupled to the common terminal between RF choke 328, capacitor 341, resistor 344. The cathode of SCR 346 is connected in series with one terminal of the primary winding 351a of transformer 351 while the remaining terminal is coupled to the common terminal between capacitor 349, resistor 344 and RF choke 330. The trigger or control electrode 348 of SCR 346 is coupled to output terminal 218 of the ignition timing circuit shown in FIGS. 1 and 4. The secondary or output winding 351b of transformer 351 is coupled between ground and an output terminal 352 which, in turn, is coupled to the distributor (not shown) of the engine to provide a pulse of sufficient energy to provide good ignition.

In operation, the inverter circuit generates an alternating current output at a frequency rate preferably in the range from 4,000—20,000 c.p.s. During the time in which the upper terminal of secondary winding 317c is positive, diode 324 conducts causing capacitor 341 to be charged in a direction shown by the "+" and "−" symbols immediately adjacent capacitors 341 and 349. During the reverse state, i.e., when the upper terminal of secondary winding 317c is negative, diode 327 conducts to charge capacitor 349 in the same direction as mentioned hereinabove. Capacitors 341 and 349 are usually fully charged within several cycles of the frequency of operation of the inverter circuit.

SCR 346 is normally turned OFF. The trigger pulse from output terminal 218 occurring at the desired timing for spark ignition is applied to control electrode 348 causing SCR 346 to conduct and thereby discharge capacitors 341 and 349 through primary winding 351a which, in turn, inductively couples this pulse through secondary winding 351b to the engine distributor. The nature of the SCR is such that it will remain conductive until the voltage across the capacitors 341 and 349 is fully discharged in spite of the fact that the trigger pulse applied to terminal 348 may be removed.

RF chokes 328 and 330 act as high impedance elements to isolate the inverter circuit from a fully discharged load so as to have no ill effects upon the normal operation of the inverter. Thus, even though the inverter periodically feeds into a fully discharged load (during the intervals of conduction of SCR 346) the high impedance of the RF chokes isolates the inverter from the load to maintain operation of the inverter at its normal operating frequency. Typically, the capacitive charging circuit is charged at ignition frequency. Since the inverter operates at a frequency which is at least 10 times as great or in some cases 50 times as great a repetition rate (i.e., a frequency from 4,000—20,000 c.p.s.) the RF chokes may be quite small (for example, of the order of 5 millihenries) and yet provide a relatively high impedance between the inverter circuit and the load. The use of a pair of such RF chokes in both branches of the half-wave double circuit assures complete isolation while at the same time permitting the use of chokes which are physically much smaller than the inductors normally employed in conventional circuits. Although the capacitors 341 and 349 reach full charge only after several cycles of the inverter frequency, the vastly greater inverter operating frequency nevertheless assures development of a full charge across the capacitors well prior to the desired ignition time for each cylinder. A good spark normally requires an energy of the order of 40 millijoules to assure good ignition. The circuit of FIG. 3 has been found to provide at least this minimum requisite energy.

It can be seen from the foregoing description that the present invention provides a novel solid-state electronic ignition timing circuit for providing spark ignition at the appropriate moment commensurate with engine r.p.m. so as to provide vastly improved engine efficiency and operation as compared with conventional techniques and which mechanical wear and mechanical inertia which constitute limiting factors in the efficiency of conventional devices, are totally eliminated.

Although there has been described a preferred embodiment of this novel invention, many variations and modifications will now be apparent to those skilled in the art. Therefore, this invention is to be limited, not by the specific disclosure herein, but only by the appending claims. For example, the staircase generator may be replaced by a constant voltage level which is compared against the average voltage level developed by the tachometer to greatly simplify the overall system for less sophisticated applications. As another modification, for throttle or vacuum advance, a variable resistance type of transducer could be mechanically coupled either to the throttle or venturi vacuum and produce the same effect as potentiometer 64. Also the cylinder phototransistor 13 may be used to drive the tachometer thereby eliminating the need for the position markers 224 and the position phototransistor 120. In this manner the output waveform developed by 310 would be a constant slope instead of a staircase waveform.

The embodiments of the invention in which an exclusive privilege or property I claim are defined as follows:

1. Means for controlling the ignition timing of an internal combustion engine in accordance with engine r.p.m. and rate of change of engine r.p.m. comprising:

first means coupled to said engine for generating position pulses generated at a rate representative of the magnitude of engine r.p.m.;

second means for generating cylinder pulses wherein each pulse is associated with one cylinder of said engine;

first and second energy storage means;

constant current generating means for charging said first energy storage means in a substantially linear fashion;

clamping means coupled to said first means for discharging said first energy storage means upon the occurrence of each position pulse;

third means coupled between said first and second energy storage means for charging said second storage means to the peak voltage level achieved by said first energy storage means;

staircase generating means coupled to said first means for generating a staircase voltage waveform;

comparison means coupled to said staircase generating means and said second energy storage means for generating a trigger output signal when the voltage level of said staircase generating means exceeds the voltage level of said second energy storage means;

recycling circuit means coupled to said comparison means and said second means for terminating the generation of said staircase voltage waveform upon the occurrence of each trigger output signal and for recycling the generation of said staircase voltage waveform upon the occurrence of each cylinder pulse.

2. Means for controlling the ignition timing of an internal combustion engine in accordance with engine r.p.m. and rate of change of engine r.p.m. comprising:

first means coupled to said engine for generating position pulses generated at a rate representative of the magnitude of engine r.p.m.;

second means for generating cylinder pulses wherein each pulse is associated with one cylinder of said engine;

third means coupled to said first means for generating a voltage level representative of engine r.p.m.;

fourth means coupled to said first means for generating a staircase voltage waveform of substantially constant slope regardless of engine r.p.m.;

fifth means coupled to said second means for recycling said fourth means upon the occurrence of each cylinder pulse;

comparison means coupled to said third means and said fourth means for generating a trigger output pulse when the level of said staircase voltage waveform exceeds the level of the output of said third means, whereby each trigger output signal is generated at a time to yield optimum engine efficiency.

3. The apparatus of claim 1 wherein said first means and second means are each comprised of a photosensitive element;

a light source;

disc means being mechanically coupled to and driven by said engine at a rate proportional to engine r.p.m.;

said disc being provided with first and second circular tracks;

said first track having a pattern for interrupting the passage of light from said light source to one of said photosensitive elements to generate said position pulses;

said second track having a pattern for interrupting the passage of light from said light source to the remaining one of said photosensitive elements to generate said cylinder pulses;

the pattern of said second track being adapted to generate a quantity of pulses equal to the number of engine cylinders per complete revolution of said engine and being substantially smaller in number than the number of pulses per revolution caused to be generated by said first track.

4. The apparatus of claim 1 wherein said first and second energy storage means are each comprised of a capacitor;

said third means comprising a diode whose polarity is such as to permit charging of said second energy storage means by said first energy storage means and to prevent charging of said first energy storage means by said second energy storage means.

5. The apparatus of claim 1 wherein said constant current generating means is comprised of transistor means and a potential divider circuit for regulating the magnitude current flowing through said transistor for charging said first energy storage means;

said potential divider circuit comprising at least one adjustable resistor.

6. The apparatus of claim 5 further comprising second adjustable resistor means coupled to said clamping means for regulating the rate of change of charging of said first energy storage means proportional to engine r.p.m.

7. The apparatus of claim 1 further comprising first adjustable limiting means coupled to said second energy storage means for limiting the maximum voltage level which may be stored by said second energy storage means.

8. The apparatus of claim 7 further comprising second limiting means coupled to said energy storage means for limiting the minimum voltage level which may be stored by said second energy storage means.

9. The apparatus of claim 1 further comprising:

first and second amplifier means coupled to said first and second means respectively, for amplifying and pulse shaping said position and cylinder pulses respectively to provide sharp output pulses therefrom;

monostable multivibrator means coupled to said first amplifier means for generating pulses of predetermined pulse width upon the application of each sharp output pulse;

bistable circuit means coupled to said monostable multivibrator means for halving the frequency rate of said sharp output position pulses;

the output of said bistable circuit being connected to said clamping means to enable said clamping means to discharge said first energy storage means at a rate controlled by the pulse rate of said position pulses.

10. The apparatus of claim 1 further comprising:

a low voltage circuit for providing output pulses each of at least a predetermined minimum level of electrical energy to a load circuit said pulses being generated at a variable rate controlled by said trigger output signals comprising:

a constant voltage source;

transformer means including primary and secondary windings;

an inverter circuit including said primary winding being coupled to said constant voltage source for generating an alternating output waveform at a frequency substantially greater than the maximum rate of generation of said output pulses;

capacitor means;

half-wave doubler means comprising first and second branches coupled between said capacitor means and said output winding for charging said capacitor means;

a normally nonconductive trigger circuit coupled between said capacitor means and a load circuit, said trigger circuit including a control electrode adapted, upon receipt of a trigger output signal to render said trigger circuit conductive to discharge said capacitor means into said load circuit;

plural RF choke means each coupled between one of said doubler branches and said capacitor means for isolating said inverter circuit from said load to enable said inverter circuit to maintain normal operation even when said capacitance circuit is fully discharged.

11. Means for controlling the ignition timing of an internal combustion engine in accordance with engine r.p.m. and rate of change of engine r.p.m. comprising:

first means coupled to said engine for generating position pulses generated at a rate representative of the magnitude of engine r.p.m.;

second means for generating cylinder pulses wherein each pulse is associated with one cylinder of said engine;

first and second energy storage means;

constant current generating means for charging said first energy storage means in a substantially linear fashion;

clamping means coupled to said first means for discharging said first energy storage means upon the occurrence of each position pulse;

third means coupled between said first and second energy storage means for charging said second storage means to the peak voltage level achieved by said first energy storage means;

ramp generating means coupled to said first means for generating a staircase voltage waveform;

comparison means coupled to said ramp generating means and said second energy storage means for generating a trigger output signal when the voltage level of said ramp generating means exceeds the voltage level of said second energy storage means;

recycling circuit means coupled to said comparison means and said second means for terminating the generation of said ramp voltage waveform upon the occurrence of each trigger output signal and for recycling the generation of said ramp voltage waveform upon the occurrence of each cylinder pulse.